Feb. 7, 1967 F. VACHA 3,302,606

INSTRUMENT BALANCE WEIGHT

Filed June 14, 1966

INVENTOR.
FRED VACHA
BY
Weingarten, Orenbuch & Lakind
ATTORNEYS

United States Patent Office 3,302,606
Patented Feb. 7, 1967

3,302,606
INSTRUMENT BALANCE WEIGHT
Fred Vacha, Bow, N.H., assignor to Beede Electrical Instrument Co., Inc., Penacook, N.H., a corporation of New Hampshire
Filed June 14, 1966, Ser. No. 557,506
3 Claims. (Cl. 116—136.5)

This invention relates in general to indicating instruments and more particularly in adjustable means for precisely balancing instrument movements.

It is known that movements of indicating instruments, such as electrical voltmeters and ammeters generally must be balanced so that the pointer's position will be substantially unaffected by changes in the attitude of the meter. The need for movement balance applies to practically all meters where there is a likelihood that the meters will be installed at various angles or in mobile mountings. The balance of the meter is best achieved when the centroid of the movement occurs precisely at the pivotal axis. To this end, most pointers for meters are made in the form of a cross having four arms at right angles to each other, one arm being of greater length than any of the other three to serve as the indicating arm of the meter. The other three arms, generally referred to here as crossarms, are available to accept adjustable weights for balancing the meter movement. The pivot point is located at the intersection of the four arms and it is this point at which the centroid must be located. The weights are positioned upon the crossarms to place the centroid at the desired locations and when proper balance has been achieved, the meter gives consistent readings irrespective of changes in the plane in which the meter pointer operates.

It is desirable that the mass of each weight used for balancing be concentrated; that the weight be easily positioned along the crossarm; that the weight have enough holding force to prevent it from inadvertently shifting its position on the crossarm; and that the number of different weight sizes be a minimum. The weighting devices previously used do not satisfy all of these requirements and it is the primary object of the present invention to provide weights that do meet those requirements. Until now, balance weights have been made of brass or Phosphor bronze wire which is coiled into a closely wound helix. Difficulties are presented by the helical configuration because the mass of the weight is not concentrated but rather is distributed over an appreciable length of coil. Due to the limited space available in a meter and the shape of the crossarm members, coiled weights must be of relatively small diameter so that an increase in mass of a coiled weight is obtained primarily by an increase in length, with some variation being available in the gauge of the wire. Where a long coil is employed the range of sliding adjustments along the crossarm is reduced.

The limitation upon the length of a coil with respect to its crossarm has made it necessary to use several different wire sizes and coil lengths to obtain weights covering the whole range required for balancing. Further the length of the usual crossarm precludes more than one coil being placed upon it. Typically, as many as eight different coil weights have been required to cover the whole range. Because the range of sliding adjustments is restricted, balancing with conventional coils is uneconomically time consuming due to the trial and error procedure necessary to find the correct weight before being able to make the final sliding adjustments.

Another disadvantage of the helical coil balance weight is the problem of controlled sliding friction. The weight must not be too easily slidable along the crossarm because accidental shifts after installation must be avoided, while at the same time too much friction could result in damage to the delicate bearings of the meter when adjustments in position of the weight are made. It is not feasible to mass produce helical coils with close enough tolerances for controlled sliding friction and therefore the conventional helical coil is made slightly oversize and a small bend is put in the middle of the length of coil to give a three point contact. For the coils made of heavier gauge wire, this has not proved wholly satisfactory because those coils are too rigid to be easily bent the proper amount. The heavier coils are, therefore, often cemented in place after balancing, but the added operation of cementing, the additional weight of the cement plus the fact that a portion of the solvent used in the cement eventually evaporates, all go toward making a time consuming and somewhat inaccurate operation.

The balance clip of this invention is designed to overcome the limitations of the conventional helical coil balance weight. The invention provides a weight in the form of a clip having a concentrated mass with spring controlled friction to allow sliding the clip along the crossarm. The balance clip is fabricated of spring wire, preferably rectangular in cross section, which is folded upon itself and the clip is provided with an interior groove to accommodate the crossarm. Due to the compactness of the balance clip, a considerably greater length of crossarm is available for balancing adjustments than is the case when helical coil weights are used. More than one clip may be placed on each crossarm if necessary, resulting in the need for only two different sizes of clips, for normal balancing situations. Because only two sizes are required, the balancing operation is simplified. Once mounted the balance clips remain in place even with severe shock and vibration, and yet they can be repositioned with a force sufficiently small so that there is no damage to delicate pivots.

The invention can be more readily understood from the following exposition which is intended to be considered in conjunction with the accompanying drawing in which.

Figure 1:
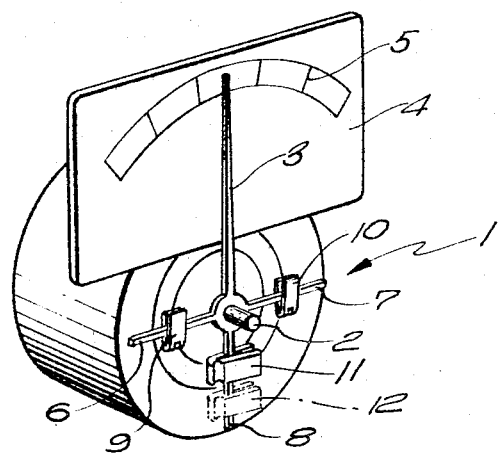
FIG. 1 is a perspective view of an instrument whose movement is balanced by weight spring of clips of this invention.

Referring now to FIG. 1 of the drawings, there is depicted a meter 1 having a movement which includes a pivot shaft 2 carrying a cruciform pointer 3. When the meter is actuated, as by an electric current or an electric potential, the movement causes the pointer to be deflected. The meter utilizes a dial plate 4 having a scale 5 for indicating the amount of deflection of the pointer. The cruciform pointer has three crossarms 6, 7, and 8 which are of rectangular cross section.

The movement of the meter is balanced by securing weights to the crossarms of the pointer. When properly balanced, the response of the meter is unaffected by its position. That is, when properly balanced, the meter gives the same reading even though the meter may be lying upon its side, in an inverted position, or in any other attitude. By stationing the weights upon the crossarms to place the centroid of the movement at the pivotal axis, the moment arm is reduced to zero and there is hence, no tendency for the movement to rotate whatever the position of the meter.

Figure 2:
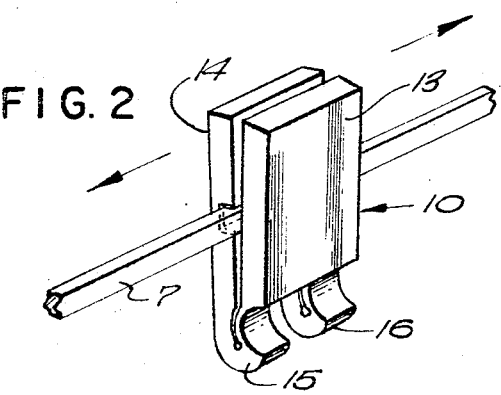
FIG. 2 depicts a balance weight spring clip embodying the invention.
Figure 4:
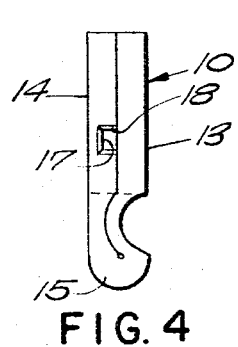
FIG. 4 is a side elevational view of the FIG. 2 embodiment.
Figure 3:
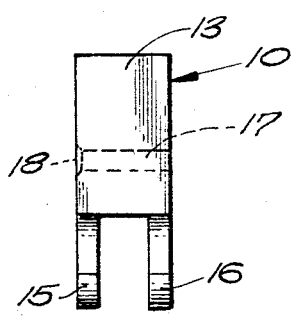
FIG. 3 is a plan view of the FIG. 2 embodiment.

In FIG. 1, balance weights 9, 10, 11, 12, constructed in accordance with the invention, are stationed upon the crossarms 6, 7, and 8. The details of a balance weight are more readily apparent from FIGS. 2, 3, and 4. The balance weight 10 is constructed from a strip of spring wire that is of rectangular cross section. The strip is bent double to form a clip having confronting platens 13 and 14. To reduce the spring force acting against separation of the platens, a portion of the hinge is removed to provide hinge legs 15 and 16. To further lessen the spring force opposing separation of the platens, the thickness of the hinge legs is reduced. One platen has a channel 17 whose depth is slightly less than the thickness of crossarm 7. The channel, as shown in FIG. 3 has a flared opening 18 which permits entry of the end of the crossarm 7. Upon forcing the clip onto the crossarm, platens 13 and 14 are forced apart because channel 17 is too shallow to completely accommodate the crossarm. Spreading of the platens is opposed by the spring tension of the clip. That spring tension is sufficient to hold the clip firmly in place on the crossarm but is light enough to allow the clip to be slid along the crossarm without requiring such force as would damage the bearings of the meter or buckle the crossarm. The shape of channel 17 conforms closely to the rectangular cross-sectional shape of the crossarm 7 so that the only permissible motion of the clip is sliding motion along that crossarm. The clip cannot rotate relative to the crossarm nor can it change its position on the crossarm except in the lateral directions.

As previously explained, spring tension of the clip is controlled by shaping the hinge. Where the clip 10 is fabricated from relatively thick stock for the heavier weight, the feet are considerably reduced in thickness to lessen the spring tension. Further, the thickness of the stock permits channel 17 to be formed by indentation.

Figure 5:
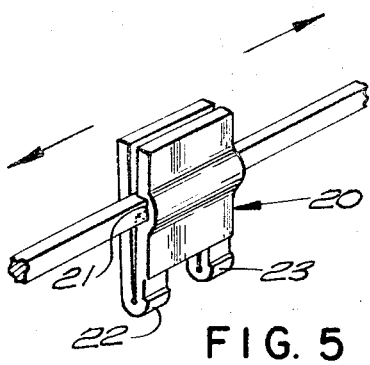
FIG. 5 illustrates another embodiment of the invention.

The lighter weight spring clip 20, illustrated in FIG. 5, is made of stock whose thickness does not permit removal of metal to form a channel. The channel 21 is, therefore, made by methods which shape the strip into the desired form without necessitating removal of stock. Further, the thickness of the feet 22 and 23 of clip 20 need be reduced only slightly, if at all, to obtain the requisite spring tension.

In view of the multitude of ways in which the invention can be embodied, it is not intended that the scope of the invention be restricted to the precise structures illustrated in the drawings or described in the exposition. Rather it is intended that the scope of the invention be delimited by the claims appended hereto and that within that scope be included only those structures which in essence utilize the invention.

What is claimed is:

1. A balance weight providing a concentrated adjustable mass for the movable crossarm of an instrument comprising a unitary, generally flat strip of spring metal folded to provide a pair of hinged confronting platens, the spring tension of said hinge acting to oppose separation of said platens, one of said platens having an open channel extending thereacross substantially parallel to said hinge, the depth of said channel being shallower than the thickness of said crossarm upon which said balance weight is ot be stationed; and the open side of said channel facing the confronting platen.

2. A balance weight according to claim 1 wherein the hinge of the confronting platens comprises a pair of dependent feet of thickness less than said platens.

3. A balance weight according to claim 2 wherein said channel flares outwardly at one end thereof to facilitate insertion onto an end of said crossarm.

No references cited.

LOUIS J. CAPOZI, *Primary Examiner.*

Disclaimer 3,302,606.—*Fred Vacha*, Bow, N.H. INSTRUMENT BALANCE WEIGHT.
Patent dated, Feb. 7, 1967. Disclaimer filed Apr. 4, 1969, by the inventor; the assignee, *Beede Electrical Instrument Co., Inc.*, assenting
Hereby enter this disclaimer to all of the claims of said patent.
[*Official Gazette July 8, 1969.*]